United States Patent [19]

Ohhashi

[11] Patent Number: 4,547,179
[45] Date of Patent: Oct. 15, 1985

[54] TIMING BELT PULLEY AND METHOD OF MANUFACTURE

[75] Inventor: Yasuo Ohhashi, Saitama, Japan

[73] Assignee: Honda Giken Kogyo Kabushiki Kaisha, Tokyo, Japan

[21] Appl. No.: 455,286

[22] Filed: Jan. 3, 1983

[30] Foreign Application Priority Data

Jan. 7, 1982 [JP] Japan ................................. 57-1128
Jan. 7, 1982 [JP] Japan ................................. 57-1126
Jan. 25, 1982 [JP] Japan ................................. 57-9913

[51] Int. Cl.$^4$ ............................................. F16H 55/30
[52] U.S. Cl. ................................... 474/152; 29/159.2
[58] Field of Search ................. 474/152, 161; 74/448, 74/449; 29/159.2

[56] References Cited

U.S. PATENT DOCUMENTS

| 820,789 | 5/1906 | Hutchins | 474/161 X |
| 1,004,980 | 10/1911 | Broadfield | 474/152 X |
| 2,436,694 | 2/1948 | Hornbrook et al. | 474/152 |
| 3,590,456 | 7/1971 | Seaman | 29/159.2 |

Primary Examiner—James A. Leppink
Assistant Examiner—Frank H. McKenzie, Jr.
Attorney, Agent, or Firm—Lyon & Lyon

[57] ABSTRACT

A pulley particularly developed for timing belt systems for engines where the outer pulley surface is formed from a corrugated strip butt welded together. The resulting cylindrical ring is fixed to an inner formed wheel and conveniently positioned during assembly by tabs protruding inwardly from the cylindrical ring. The wheel is further fixed to an inner hub for placement on a shaft or the like. Protrusions on the outer surface of the wheel cooperate with recesses on the inside of the cylindrical ring to help interlock and locate the ring thereon.

15 Claims, 12 Drawing Figures

TIMING BELT PULLEY AND METHOD OF MANUFACTURE

BACKGROUND OF THE INVENTION

The field of the present invention is pulleys for timing belts for engines and particularly the construction thereof.

Heretofore timing belt pulleys generally have been constructed from a single piece or multiple pieces including a machined or cast outer wheel. The wheel must necessarily be constructed to provide some means for maintaining the indexing of the timing belt or chain. Consequently, the outer wheel must include some mechanism such as teeth to insure proper indexing. Additionally, with the advent of modern timing belts, a variety of belt tooth designs have been available. Such designs have necessitated intricate pulley surface designs as well. Additionally, the belts generally require pulleys of wider axial dimension to reduce the pressure on the belt.

The foregoing conditions and requirements have often necessitated rigorous machining or finishing operations to form the pulley surface. In the high production environment of automobile manufacturing and the like, such intricate designs and the like have proven to be a major expense. Accordingly, an inexpensive, accurate and durable timing belt pulley wheel has long been sought.

SUMMARY OF THE INVENTION

The present invention is directed to an improved pulley wheel structure and method of making same for timing belts, particularly for use in engines and the like. The pulleys of the present invention are fabricated from a central hub, a surrounding wheel and a cylindrical ring. The cylindrical ring is corrugated to provide the pulley surface. Advantageously, the ring may be stamped or otherwise formed in a flat arrangement, cut and butt welded to form the cylindrical ring. As a result, accuracy, durability and ease of manufacture are achieved.

Ease of manufacture and quality are further enhanced by the structure of the pulley inwardly of the cylindrical ring. Tabs are provided internally of the cylindrical ring to achieve proper placement of the cylindrical ring on the wheel. A shoulder is provided on the hub for a like purpose. Protrusions on the wheel extending between the hub and the cylindrical ring may also be designed to provide angular rigidity between the wheel and the cylindrical ring and yet do not require excessive and difficult forming operations.

Accordingly, it is an object of the present invention to provide an improved pulley for timing belts and one which is easily manufactured. Other and further objects and advantages will appear hereinafter.

DETAILED DESCRIPTION OF THE PREFERRED EMBODIMENT

Figure 1:
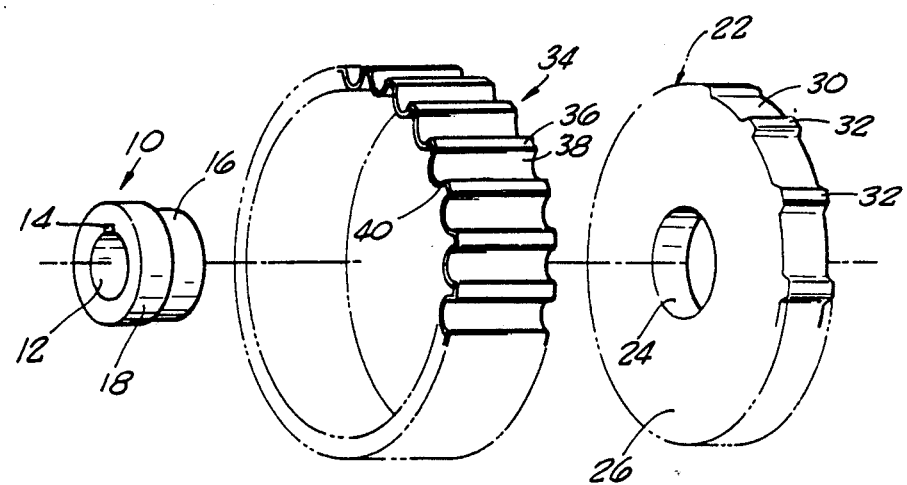
FIG. 1 is an exploded perspective view of a pulley of the present invention.
Figure 2:
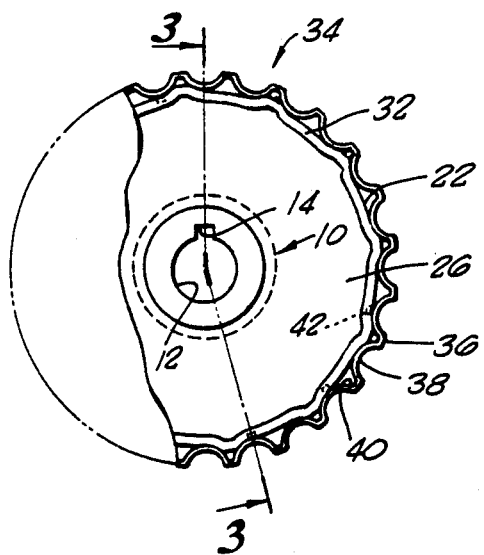
FIG. 2 is an assembled rear elevation of the embodiment of FIG. 1.

Turning in detail to the drawings, FIGS. 1-5 illustrate a first preferred embodiment of the present invention. The pulley thus illustrated includes a central hub 10. The hub 10 includes a means by which it may be mounted to a shaft of an engine. In this embodiment, a central bore 12 and keyway 14 are illustrated. A cylindrical mounting surface 16 is concentrically arranged about the hub 10. A raised cylindrical surface 18 provides a shoulder 20 adjacent the cylindrical surface 16.

Concentrically arranged around the hub 10 is a wheel, generally designed 22.

Figure 3:
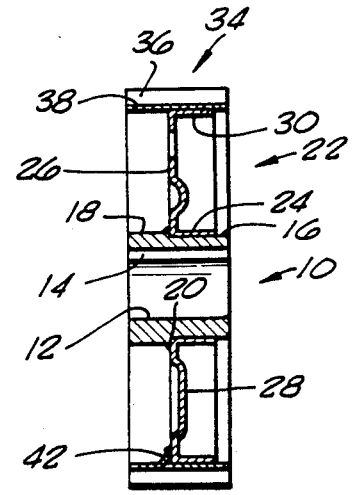
FIG. 3 is a cross-sectional elevation taken along line 3—3 of FIG. 2.
Figure 4:
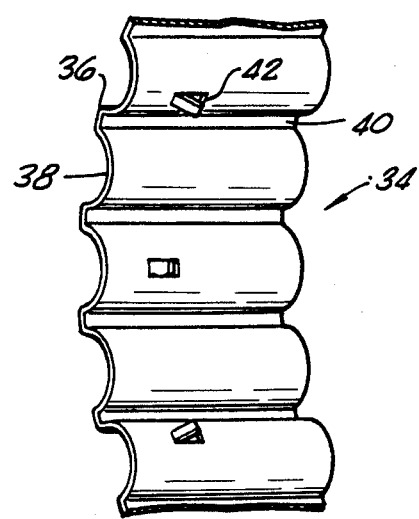
FIG. 4 is a detailed view of a section of the interior of the cylindrical ring of the embodiment of FIGS. 1-3.

The wheel 22 includes an inner cylindrical flange 24 which is sized to closely fit on the cylindrical mounting surface 16 of the hub 10. As the flange 24 fits on this mounting surface 16, it abuts against the shoulder 20 of the hub 10. This positioning of the wheel 22 against the shoulder 20 results in an orientation of the wheel 22 in a plane perpendicular to the axis of the hub 10 and advanced axially on the hub 10 to a preselected midpoint position. This midpoint position may be at any point along the hub 10 but is illustrated in the first embodiment as being near the center of the assembled pulley. The wheel 22 may then be welded to the hub 10 preferably at the shoulder 20 as can be seen in FIG. 3 but also at the back distal edge of the inner cylindrical flange 24.

The wheel 22 extends outwardly in a radial direction from the inner cylindrical flange 24 to form a web 26 the web 26 may conveniently include strengthening ribs 28 and the like to reduce the propensity of the pulley to vibrate axially at the cylindrical rim relative to the hub. Lightening holes and the like may also be employed where appropriate.

At the outer periphery of the wheel 22, an outer cylindrical flange 30 extends to form a second cylinder. In the first embodiment, this flange extends in the same axial direction as the inner cylindrical flange 24 and the flanges are equal in width. This arrangement is convenient for ease of manufacture. The outer cylindrical flange 30 includes a plurality of protrusions 32 which are equiangularly spaced about the wheel 22. These protrusions 32 are designed to fit into recesses on the cylindrical ring discussed below. The protrusions are designed to be simply formed so that they do not require complicated or intensive manufacturing techniques.

Positioned about the outer cylindrical flange 30 of the wheel 22 is a cylindrical ring 34. The cylindrical ring 34 is preferably formed by butt welding a strip of material which has been previously stamped to give the appropriate outer pulley surface. The stamping may be performed on a continuous strip which is then cut to length. The stamping forms corrugations defining teeth 36 and spaces 38 therebetween. In the preferred embodiment of FIGS. 1-5, a surface design is shown to accommodate one form of standard timing belt having teeth forming cylindrical segments. Such a configuration is difficult to machine from circular stock.

The corrugated nature of the cylindrical ring 34 defines recesses 40 on the inner side of the ring behind each tooth 36. The recesses 40 provide a convenient area for receipt of the protrusions 32 of the wheel 22. The protrusions 32 conveniently extend only partway into the recesses 40 as can best be seen in FIG. 5. This marginal conformance of the protrusions 32 into the recesses 40 satisfies two requirements. First, the interlocking of the wheel 22 and the cylindrical ring 34 insures that the cylindrical ring 34 will not rotate relative to the wheel 22 and hub 10. Thus, the system will remain properly indexed. Second, the protrusions may be formed by a simple single step process which also does not weaken the wheel. Thus, pulley integrity is achieved with minimum manufacturing cost.

To properly position the cylindrical ring 34 on the outer cylindrical flange 30 of the wheel 22, tabs 42 are positioned at equiangular location about the inside of the cylindrical ring 34. These may be conveniently stamped into the cylindrical ring 34 at the same time that the corrugations are made. Naturally, a separate process may be employed where advantageous. The tabs are oriented to define a plane perpendicular to the axis of the pulley at which the wheel 22 may be positioned. The tabs 42 are primarily intended for ease of assembly rather than for permanent retention of the cylindrical ring 34 on the wheel 22. Instead, the wheel 22 and ring 34 may be welded one to the other.

Figure 5:
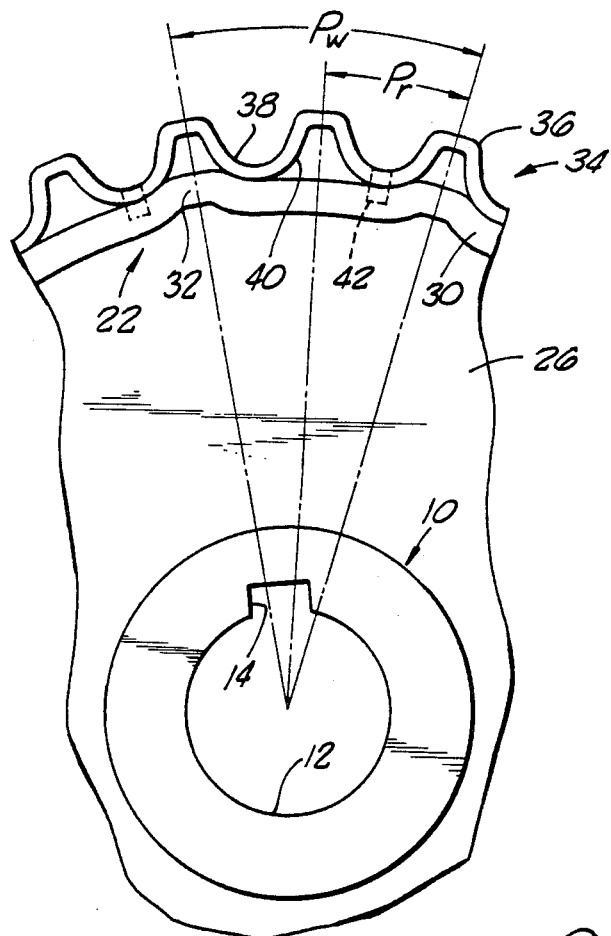
FIG. 5 is an enlarged segment of the view of FIG. 2.
Figure 6:
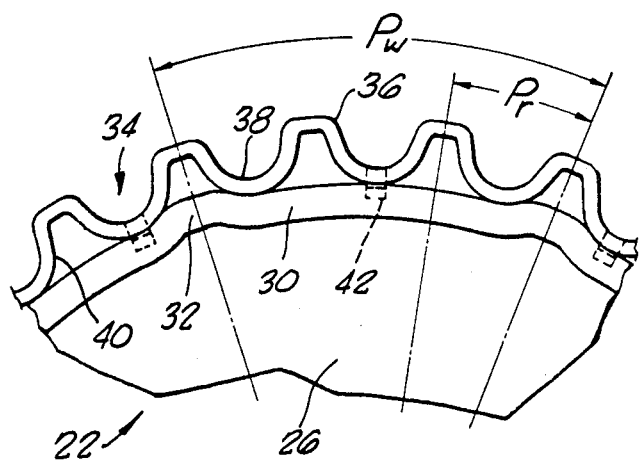
FIG. 6 is a similar view to that of FIG. 5 illustrating a second embodiment.
Figure 7:
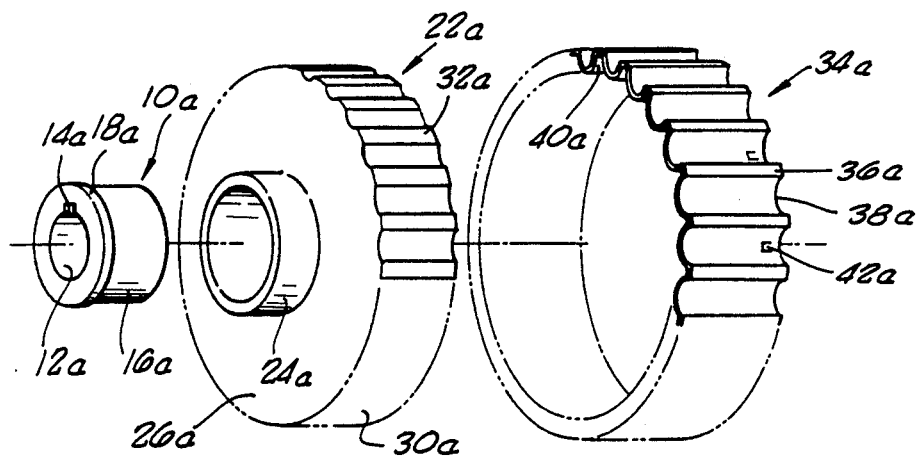
FIG. 7 is an exploded assembly perspective view of a third embodiment of the present invention.
Figure 8:
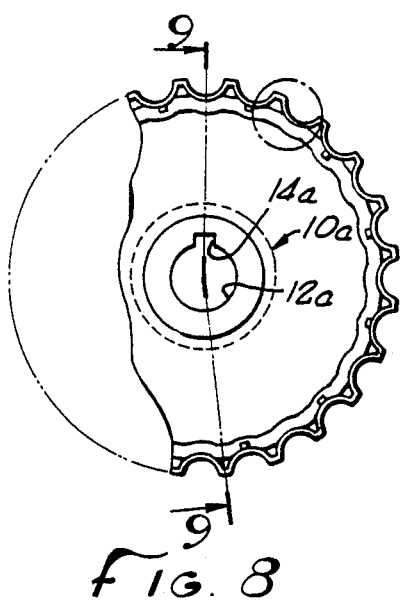
FIG. 8 is an assembled rear elevation of the embodiment of FIG. 7.

As can best be seen from the variations between FIGS. 5 and 6, the pitch of th protrusions 32 may be a convenient multiple of the pitch of the teeth 36. In FIG. 5, the pitch of the wheel $P_w$ is twice that of the pitch of the ring $P_r$. In FIG. 6 $P_w$ is three times $P_r$. Any convenient multiple may be employed which provides adequate interlocking between the wheel 22 and the ring 34. For balance and alignment purposes, the protrusions 32 may be arranged such that all of the spaces between protrusions are equal. However, for certain numbers of teeth, this is impossible and one or more spaces may be varied to accommodate such conditions without significant adverse effects. Naturally, if the lack of symmetry becomes a problem, protrusions may be provided for each recess as can be seen in the embodiment of FIG. 7.

Figure 9:
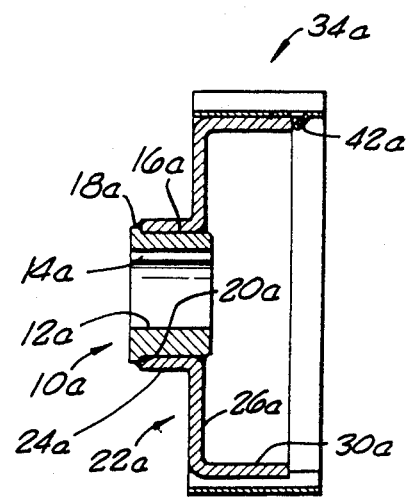
FIG. 9 is a cross-sectional elevation taken along line 9—9 of FIG. 8.
Figure 10:
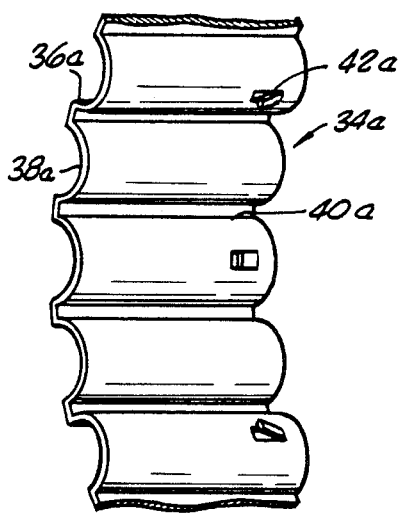
FIG. 10 is a segment of the cylindrical rim of the embodiment of FIGS. 7-9.
Figure 11:
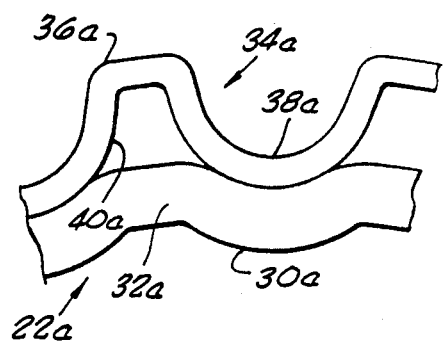
FIG. 11 is a detailed view of the portion of the pulley enclosed within the circle of FIG. 8.

Turning then to the remaining Figures, another embodiment is disclosed. This embodiment includes more substantial support by the intermediate structure of the wheel 22a. The inner cylindrical flange 24a extends substantially across the axial width of the hub 10a. A shoulder 20a is positioned near one end of the hub 10a to provide additional area to the cylindrical mounting surface 16. Likewise, the outer cylindrical flange 30a extends across substantially the full axial width of the cylindrical rim 34a. Naturally, the inner cylindrical flange 24a may extend in the opposite direction from the web 26a as the outer cylindrical flange 30a as seen in FIG. 9 or may extend in the same direction as illustrated in the prior embodiment. Welding may then take place at the intersection of the spaces 38a between teeth 36a and the outer cylindrical flange 30a of the wheel 22a. A pulley of greater strength and rigidity may thus be formed as disclosed in FIGS. 7-11.

Figure 12:
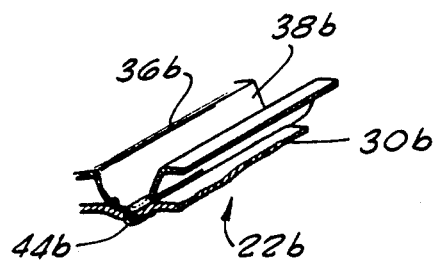
FIG. 12 is a detailed perspective view of a segment of the pulley of FIGS. 7-11 illustrating a variation in the attachment of components.

In FIG. 12, a variation in the method of attachment of the cylindrical ring 34b and the wheel 22b is disclosed. A calk 44 is formed in the cylindrical ring 34b extending inwardly to engage a slot cut into the outer flange 30b of the wheel 22b for that purpose. Welding or brazing may be optionally applied.

Accordingly, a timing belt pulley and the means of manufacturing same have been disclosed which provide ease of manufacture and accurately formed pulley surface. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A timing belt pulley comprising
    a hub;
    a wheel including an inner flange mating with said hub, an outer cylindrical flange having outwardly extending spaced protrusions thereabout, and a web extending outwardly from said inner flange to said outer flange; and
    a cylindrical ring positioned about said outer cylindrical flange and including an inner surface, an outer surface and corrugations defining teeth in the outer surface thereof for receipt of a timing belt and recesses in the inner surface thereof for receipt of said protrusions.

2. The timing belt pulley of claim 1 wherein said hub includes a cylindrical outer surface and a shoulder extending outwardly from said cylindrical surface, said inner flange of said wheel being cylindrical, positioned about said outer cylindrical surface and abutting said shoulder.

3. The timing belt pulley of claim 2 wherein said shoulder is positioned at a midpoint on said hub.

4. The timing belt pulley of claim 1 wherein said cylindrical ring is positioned between said outer cylindrical flange such that said web of said wheel extends to a midpoint in said cylindrical ring.

5. The timing belt pulley of claim 1 wherein said cylindrical ring includes inwardly extending tabs spaced about said cylindrical hub, said wheel abutting said tabs.

6. The timing belt pulley of claim 1 wherein said hub and said wheel at said inner flange are welded one to the other and said cylindrical ring and said hub at said outer cylindrical flange are welded one to the other.

7. The timing belt pulley of claim 1 wherein said inner flange is cylindrical and extends substantially across the axial width of said hub and said outer cylindrical flange extends substantially across the axial width of said cylindrical ring.

8. The timing belt pulley of claim 7 wherein said protrusions extend partway into each of said recesses to prevent relative rotation between said wheel and said cylindrical ring.

9. A timing belt pulley comprising
    a hub;
    a wheel including an inner flange mating with said hub, an outer cylindrical flange having outwardly extending spaced protrusions thereabout, and a web extending outwardly from said inner flange to said outer flange; and a cylindrical ring positioned about said outer cylindrical flange and including an inner surface, an outer surface and corrugations defining teeth in the outer surface thereof for receipt of a timing belt and recesses in the inner surface thereof, said protrusions on said outer cylindrical flange extending partway into said recesses to interlock said wheel and said cylindrical ring.

10. The timing belt pulley of claim 9 wherein said protrusions extend into each said recess.

11. The timing belt pulley of claim 9 wherein said protrusions extend into a portion of said recesses.

12. A timing belt pulley comprising
   a hub including a cylindrical outer surface and a shoulder extending outwardly from said cylindrical surface;
   a wheel including an inner cylindrical flange positioned about said outer cylindrical surface and abutting said shoulder, an outer cylindrical flange having outwardly extending spaced protrusions thereabout, and a web extending outwardly from said inner flange to said outer flange; and
   a cylindrical ring positioned about said outer cylindrical flange and including an inner surface, an outer surface and corrugations defining teeth in the outer surface thereof, recesses in the inner surface thereof, receiving said protrusions and tabs extending inwardly and spaced about said cylindrical ring, said wheel abutting said tabs.

13. The timing belt pulley of claim 12 wherein said shoulder is positioned at a midpoint on said hub and said cylindrical ring is positioned about said outer cylindrical flange such that said web of said wheel extends to a midpoint in said cylindrical flange.

14. The timing belt pulley of claim 12 wherein said inner flange is cylindrical and extends substantially across the axial width of said hub and said outer cylindrical flange extends substantially across the axial width of said cylindrical ring.

15. A method for the manufacture of timing belt pulleys comprising the steps of
   forming corrugations in a strip;
   cutting the strip to length and butt welding the ends thereof;
   stamping a plate to form a wheel including a web portion and an outer flange with outwardly extending spaced protrusions integrally formed therewith;
   placing the resulting ring on the outer flange to interlock the protrusions with the corrugations; and
   affixing the ring to the wheel.

* * * * *